United States Patent [19]

Iguchi et al.

[11] Patent Number: 5,780,836
[45] Date of Patent: Jul. 14, 1998

[54] IC CARD FOR PORTABLE TYPE ELECTRONIC APPARATUS AND CARD INSERTION METHOD

[75] Inventors: Shinichi Iguchi; Yoshihito Hirata, both of Tokyo, Japan

[73] Assignee: Oki Electric Industry Co., Ltd., Tokyo, Japan

[21] Appl. No.: 731,583

[22] Filed: Oct. 16, 1996

[30] Foreign Application Priority Data

Oct. 16, 1995 [JP] Japan .................... 7-266619
Feb. 6, 1996 [JP] Japan .................... 8-019755

[51] Int. Cl.$^6$ .................................................. G06K 7/00
[52] U.S. Cl. .................................. 235/486; 235/441
[58] Field of Search .............................. 235/441, 486

[56] References Cited

U.S. PATENT DOCUMENTS 4,743,746  5/1988  Murschall ........................ 285/486

*Primary Examiner*—Harold Pitts
*Attorney, Agent, or Firm*—Rabin, Champagne, & Lynt, P.C.

[57] ABSTRACT

The portable type electronic apparatus of the present invention is provided with an apparatus body having an apparatus side connection contact, a card holder, having guide channels for guiding an IC card to a specified position. One end side is freely rotatably attached to the apparatus body via an axis, for retaining an IC card by causing a card side connection contact to come into contact with the apparatus side connection contact, and a stopper, having edges respectively provided at the apparatus body and the card holder, for unfolding a wall between the card holder and the apparatus body accompanying rotation of the card holder.

12 Claims, 4 Drawing Sheets

IC CARD FOR PORTABLE TYPE ELECTRONIC APPARATUS AND CARD INSERTION METHOD

BACKGROUND OF THE INVENTION

1. Field of the Invention

The present invention relates to the construction a portable type electronic apparatus for loading an IC card, and to a method of inserting the IC card into the portable type electronic apparatus.

2. Description of the Related Art

Conventionally, in a portable type electronic apparatus for loading an IC card, the IC card is guided to a specified position along guide channels of a card holder. The card holder has one end attached in a freely rotatable manner to an apparatus body via an axis, so that when the card holder is housed in the apparatus body, the IC card is retained by causing a connection contact of the IC card side to come into contact with a connection contact of the apparatus body side.

From the outward appearance, the portable type electronic apparatus is provided with the apparatus body and the card holder. The IC card is temporarily retained inside the card holder. The construction is such that it is possible to set the card holder, together with the IC card, to a specified position of the apparatus body.

Additionally, a link member for regulating the amount by which the card holder can rotate with respect to the apparatus body is provided between the apparatus body and the card holder, by retaining a rotation end side of the card holder. A pair of link members are provided, respectively positioned at both the left and right sides of the card holder. Each link member is configured to have two link pieces, one end of each being freely rotatably coupled by an axis.

Further, the other end of one of the link pieces is freely rotatably coupled, via an axis pin, to an engagement hole formed in an inside surface of the apparatus body. The other end of another of the link pieces is freely rotatably coupled, via an axis pin, to an engagement hole formed in an outside surface of the card holder.

However, in the portable type electronic device described above, 1) it is possible for a finger or pieces of metal, a pen, etc. to come into contact with the contact portion by infiltrating into the interior between the card holder and the apparatus body, which means that the contact portion can easily become dirty. Further, breakage may occur. Thus the reliability of the device is lowered.

2) with respect to the left and right guide channels of the card holder, it is possible to have an insertion operation where only one of two edges of the IC card is inserted, or alternatively, neither of the edges are inserted. Thus, it may sometimes be necessary to repeat the insertion operation, and the insertion handleability of the IC card is poor.

3) there are many link components, and the construction is complicated, which means that the operability is poor and the manufacturing cost is increased.

SUMMARY OF THE INVENTION

A first object of the present invention is to provide a portable type electronic apparatus in which a finger or pieces of metal, a pen, etc. do not infiltrate into the interior between the card holder and the apparatus body.

Further, it is a second object of the present invention to provide a portable type electronic apparatus in which it is not necessary to repeat insertion of the IC card, and in which handleability is improved.

A third object of the present invention is to improve assembly operability by reducing the number of link components.

In order to achieve the first object of the present invention, there is provided a flat apparatus body having input keys, a display and an apparatus side contact, a retaining card holder, having one end freely rotatably attached to a rear side of the apparatus body via an axis and having guide channels for guiding an IC card to a specified position, for causing a connection contact of an IC card that has been guided to a specified position to come into contact with an apparatus body side connection contact, and a stopper, having a wall, and with end portions respectively pivoting the apparatus body and the card holder, for unfolding the wall between the apparatus body and the card holder accompanying rotation of the card holder.

In order to achieve the second object of the present invention, during rotation of the card holder, the axis of one end of the stopper is closer to the card holder axis side compared to the axis of the other end, and freely rotatably pivots at the card holder side wall close to the card insertion slot communicating with the guide channels. Further, in order to achieve the second object of the present invention, in another embodiment of the portable type electronic apparatus, a card guide member is provided on the other end of the card holder to communicate with the guide channels as well as to form a card introduction section for introducing the tip of the IC card.

In order to achieve the third object of the present invention, a link forming a wall and a stopper is formed in a long and narrow plate sheet form, and at the edges, axes to be fitted into the apparatus body and the card holder are integrally formed.

BRIEF DESCRIPTION OF THE DRAWINGS

FIG. 5A is an enlarged view of the circled section shown in FIG. 5.

DESCRIPTION OF THE PREFERRED EMBODIMENTS

Figure 1:
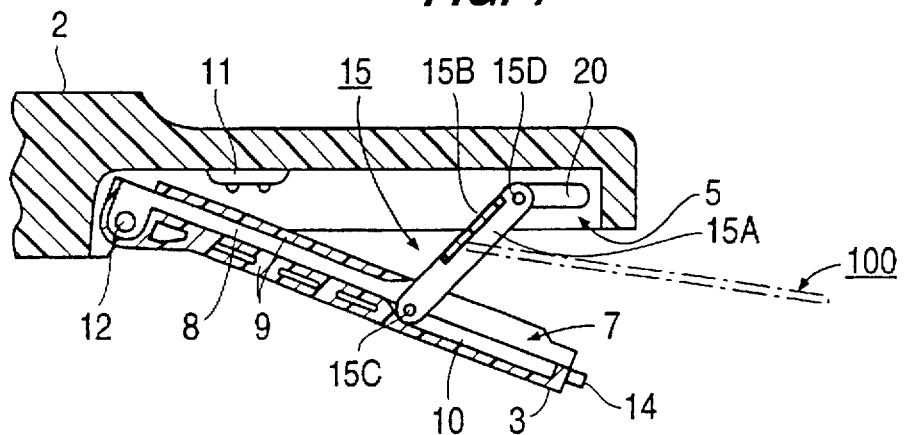
FIG. 1 is a cross sectional diagram along line I—I in FIG. 2.

Embodiments of the present invention will now be described with reference to the drawings. Elements common to each of the drawings have similar reference numerals attached thereto.

Embodiment 1

Figure 2:
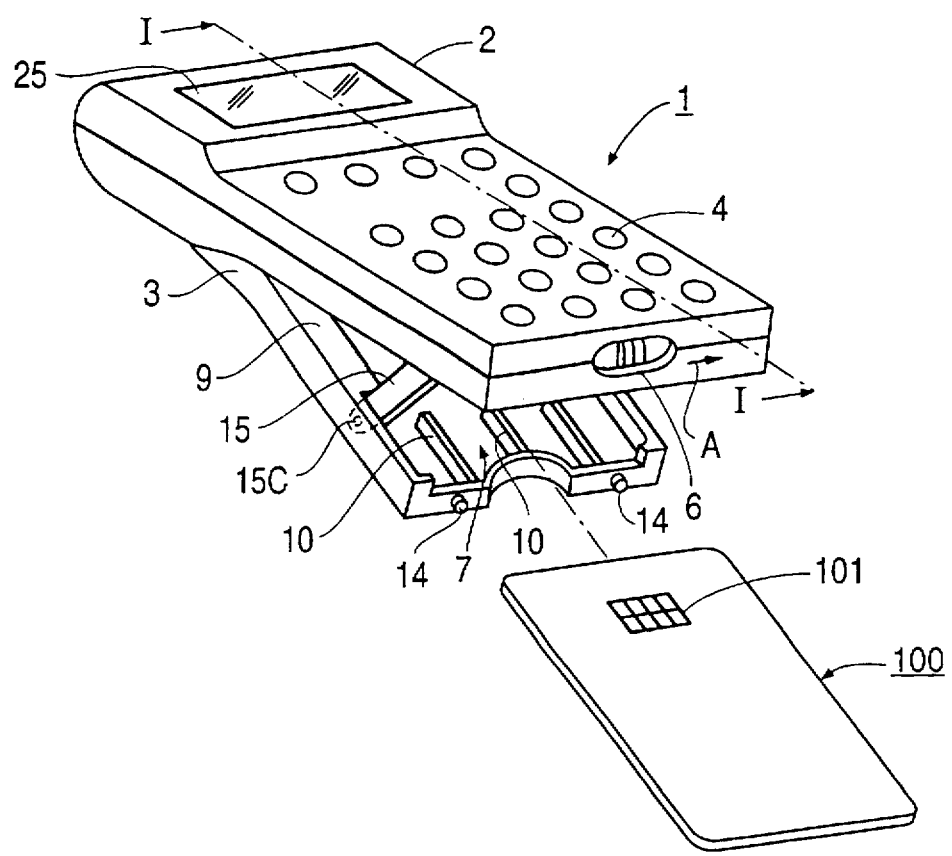
FIG. 2 is an overall perspective view of a portable type electronic apparatus according to a first embodiment of the present invention.
Figure 3:
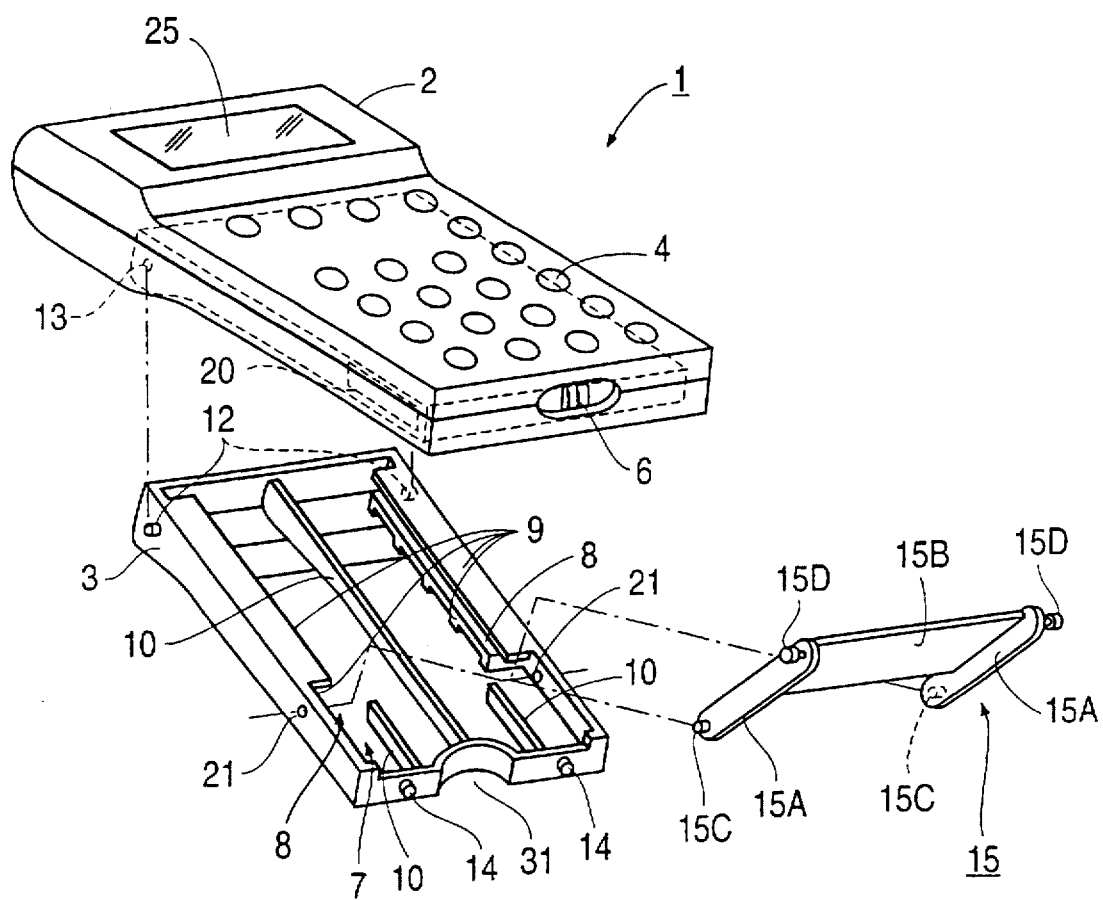
FIG. 3 is an exploded perspective view of the main components of a portable type electronic apparatus according to the first embodiment of the present invention.

FIG. 1, FIG. 2 and FIG. 3 show one example of a portable type electronic apparatus applied to the present invention, in which FIG. 1 is a cross sectional diagram along line I—I in FIG. 2; FIG. 2 is an overall perspective view of a portable type electronic apparatus according to a first embodiment of the present invention. FIG. 3 is an exploded perspective view of the main components of a portable type electronic apparatus according to the first embodiment of the present invention. FIG. 1 and FIG. 2 show the state just before an IC card is inserted.

In FIG. 1, FIG. 2 and FIG. 3, from the outward appearance, the portable type electronic apparatus 1 is provided with the apparatus body 2 and the card holder 3. The IC card 100 is temporarily retained inside the card holder 3. The construction of apparatus 1 is such that it is possible to set the card holder 3 together with the IC card 100 to a specified position of the apparatus body 2.

The apparatus body 2 has a flat form, and a plurality of input keys 4, as well as a liquid crystal display 25, etc. are arranged on the front surface constituted by the upper side. The contents (i.e., data) of the IC card 100 are displayed on the liquid crystal display 25, and the content of the IC card 100 can be processed via the input keys 4.

On the other hand, a space 5 having a concave shape for storing the card holder 3 is provided on the rear surface constituted by the lower side, of the apparatus body 2. A slide lever 6 for carrying out a lock/unlock operation for a lock member (not shown) is arranged on the front surface side of the apparatus body 2.

The card holder 3 is formed having a flat box shape and a volume that almost fills up the space 5. An upper surface and part of the front side surface, which is an end surface of the other end side, are opened. Further, a stopper 15 is provided for blocking the upper surface of the front side surface. The aperture part of the other end sides of the card holder 3 is used as a card insertion slot 7. Further, inside the card holder 3, at the left and right side surfaces, ribs 9 forming guide channels 8 for retaining left and right sides of an IC card 100 are integrally provided. Ribs 10 are also provided on the bottom surface of card holder 3 for supporting a lower surface of the IC card 100.

When the guide channels 8 are in such a condition that they lead into the card insertion slot 7, if an IC card 100 comes in from the card insertion slot 7, both the left and right sides of the IC card 100 come into contact with the respective guide channels 8, and if the card is inserted further it can be caused to be arranged at a specified position.

Further, in the state where the card has been arranged inside the card holder 3, a connection contact 101 of the IC card 100 is arranged at a position corresponding to the upper surface aperture of the card holder 3. Inside the space 5 of the apparatus body 2, an apparatus side connection contact 11 that can be electrically coupled to IC card 100 is provided at a position corresponding to the card side connection contact 101 for contacting with the connection contact 101.

On the other hand, on the outer surface of the card holder 3, at both the left and right sides, and at the rear end, axles 12 are respectively provided. The axles 12 are freely rotatably engaged with engagement holes 13 formed inside the space 5 of the card holder 3, and the card holder 3 provides a condition where the card insertion slot 7 can be rotated in an up and down direction using the axles 12 as a fulcrum, due to the engagement of the axles 12 and the engagement holes 13. Further, on the other end of the card holder 3, namely, on the front surface side, a lock post 14 is provided corresponding to a lock member operated by the slide lever 6.

The stopper 15 guides an IC card 100 being inserted along the card insertion slot 7, and protects the connection contacts 11 and 101 by preventing a finger or pieces of metal, a pen, etc. from infiltrating into the interior between the card holder and the apparatus body. Further stopper 15 restricts the amount by which the card holder 3 can rotate relative to the apparatus body 2 by retaining the end of the card holder 3. The stopper 15 has links 15A, 15A integrally formed as long and narrow plate sheets, and a plate-like wall 15B constructed between each of the links 15A. At one end of each of the links 15A, axles 15C to be fitted into respective engagement holes 21 formed in the card holder 3 are integrally formed.

At the other end of each of the links 15A, there are provided axes 15D communicating with elongated slits 20 in the space 5 so as to rotate and be freely slidable.

Because the stopper 15 guides the IC card 100 to the card insertion slot 7, the engagement holes 21 formed in the card holder 3 are provided closer toward the axle 12 than the long holes 20 provided in the side wall of the apparatus body 2, as shown in FIG. 1.

As shown in FIG. 1, the axle 15D rotates and slides backwards and forwards in the elongated slits 20 together with rotation of the card holder 3. By rotating axles 15C with axle 15D as a center point, the stopper 15 permits rotation of the card holder 3 from a "set position" stored within the space 5 of the apparatus body 2 to a position where insertion of the IC card 100 is made easy, namely, a "preset position". At the "preset position" the axles 15D reaches an end of the elongated slits 20, and is positioned closer toward the other end of the card holder 3 compared to the axle 15C, which means that the wall 15B is positioned diagonally. Therefore, in the condition where the card holder 3 is arranged at the "preset position", if the IC card 100 being inserted is brought into contact with the wall 15B, by sliding from the correct route to the upper side, the wall 15B guides the front end of the IC card 100 in the direction of the card insertion slot 7 provided alongside the axle 15C, and provides a condition in which the front end of the IC card 100 can be guided within the guide channels 8.

Further, at this time left and right direction guides are regulated by being brought into contact with links 15A, 15A, and the IC card 100 is correctly guided along the guide channels 8 inside the card insertion slot 7.

Also, as shown in FIG. 3, a notch 31 for card insertion and removal is provided in the card insertion slot 7 so as to make it possible to grasp the end of the IC card 100 when the IC card 100 is inserted or extracted.

Next, the operation for removing the IC card 100 in the portable type electronic apparatus 1 will be described. First of all, when the IC card 100 is located in apparatus 1, the slide lever 6 is slid in the unlocking direction (the direction of arrow A in FIG. 2). Then, the engagement between the lock stopper 14 and the lock member is broken. Thereafter the card holder 3 is rotated downwards, causing stopper 15 to rotate, with the axle 12 as a fulcrum, to the "preset position" restrained by the stopper 15.

FIG. 1 and FIG. 2 show the state arranged at this "preset position". At the "preset position", the other end of the card holder 3 is more exposed than the lower side of the apparatus body 2, and insertion of the IC card 100 is made easy.

Subsequently, the IC card 100 is inserted between the apparatus body 2 and the card holder 3. At this time, as the card being inserted slides to the upper side, the front end of the IC card 100 makes contact with the wall 15B, as mentioned above. Then, the front end of the IC card 100 is guided into the card insertion slot 7 by running the card alongside the wall 15B, and also, the links 15A, 15A carry out position restraint in the left and right directions. As a result, the IC card 100 is correctly guided into the guide channels 8 by way of the card insertion slot 7. Further, if the front end of the IC card 100 is inserted until it runs into the interior wall, the setting of the IC card 100 to the "preset position" is completed.

After that, the card holder 3 is pushed toward the upper side. Then, the axle 15D of the stopper 15 rotates and slides in a forward direction inside the elongated slits 20 together with rotation of the card holder 3, the axle 15C rotates as a pivot of axle 15D, and the card holder 3 rotates to the "preset position" stored inside the space 5 of the apparatus body 2.

When the card holder 3 is arranged at the "set position", the lock post 14 automatically engages with the lock member. Simultaneously, electrical connection is made between the connection contact 101 of the IC card 100 and the apparatus side connection contact 11, and the card insertion slot 7 is closed by a front wall section of the space 5. Further, when the IC card 100 is extracted, if the slide lever 6 is again slid in the unlocking direction (the direction of arrow A in FIG. 2), the engagement between the lock post 14 and the lock member is broken. While rotating the stopper 15, the card holder 3 is caused to rotate downwards to the "preset position". In this way the IC card 100 can be removed and exchanged for another IC card 100.

Second Embodiment

Figure 4:
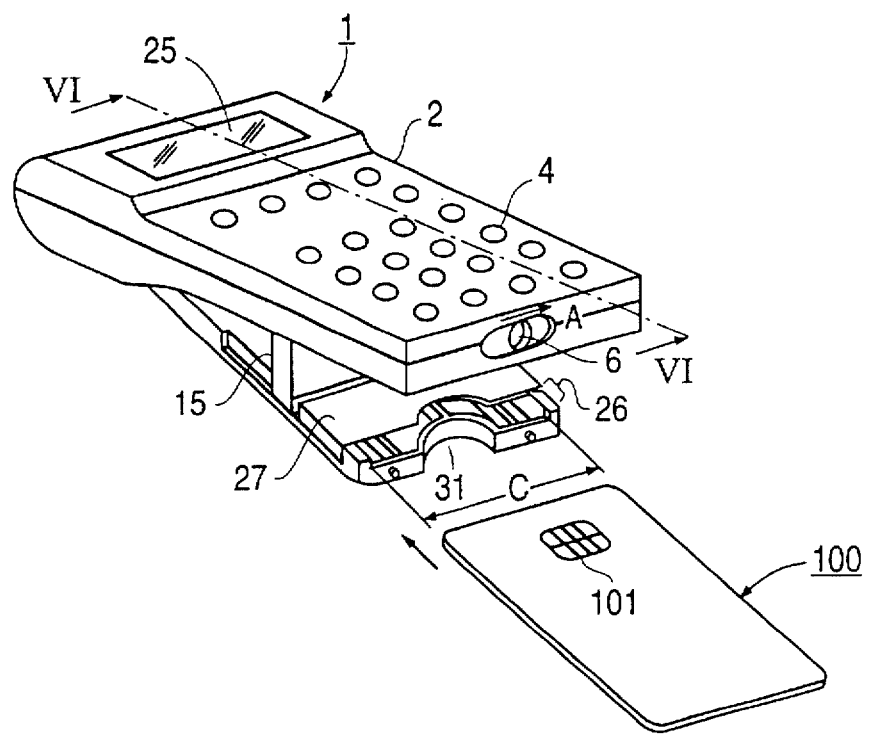
FIG. 4 is an overall perspective view of a portable type electronic apparatus according to a second embodiment of the present invention.
Figure 5:
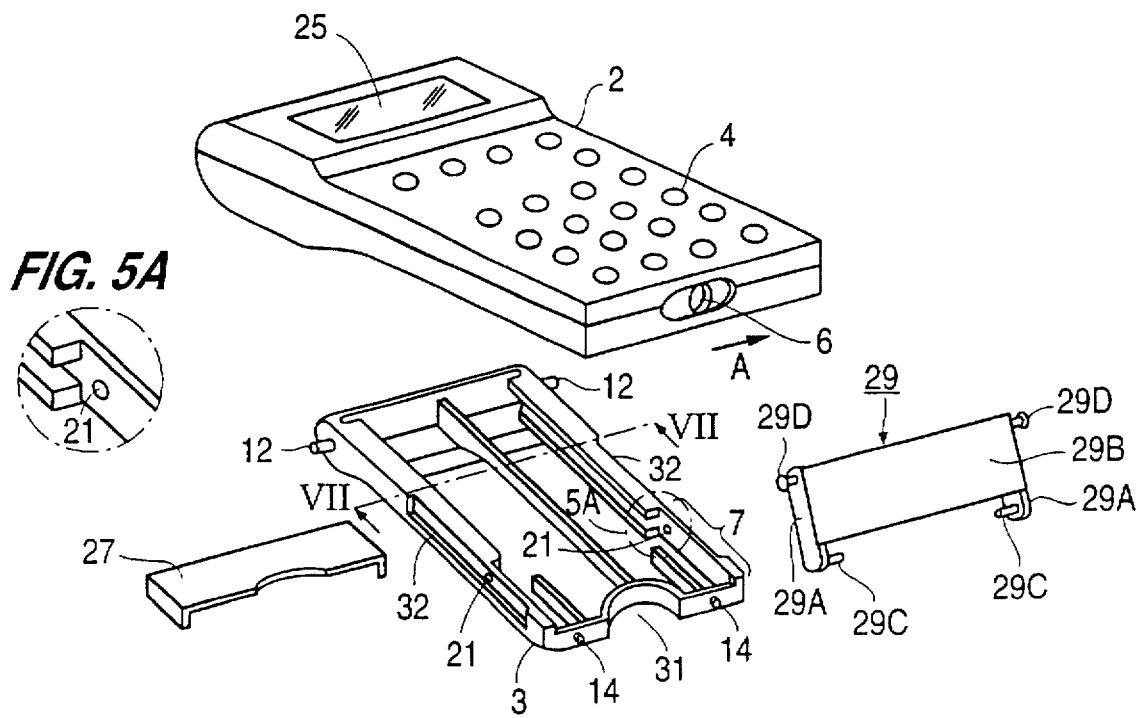
FIG. 5 is an exploded perspective view of a portable type electronic apparatus according to the second embodiment of the present invention.
Figure 6:
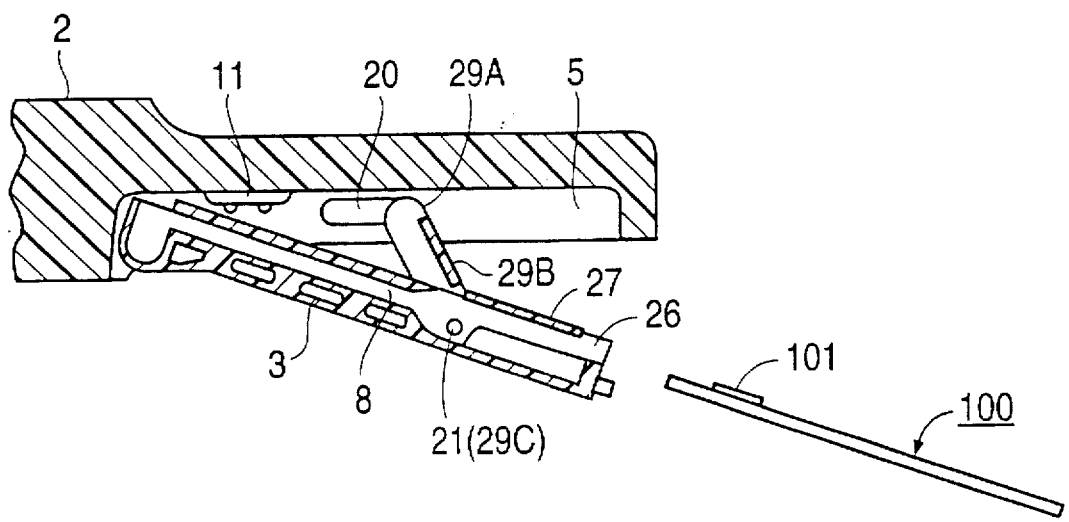
FIG. 6 is a cross sectional diagram along line VI—VI in FIG. 4.
Figure 7:
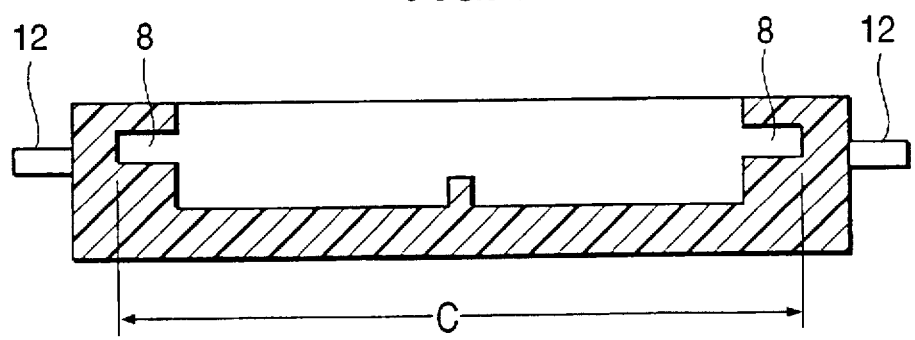
FIG. 7 is a cross sectional diagram along line VII—VII in FIG. 5.

FIG. 4 is an overall perspective view of a portable type electronic apparatus according to a second embodiment of the present invention. FIG. 5 is an exploded perspective view of a portable type electronic apparatus according to the second embodiment of the present invention. FIG. 6 is a cross sectional diagram along line VI—VI in FIG. 4. FIG. 7 is a cross sectional diagram along line VII—VII in FIG. 5.

The portable type electronic apparatus of the second embodiment outwardly appears the same as the portable type electronic apparatus of the first embodiment. It is provided with the apparatus body 2 and the card holder 3, with the IC card 100 being temporarily retained inside the card holder 3. The construction is such that it is possible to set the card holder 3, together with the IC card 100, to a specified position of the apparatus body 2.

The difference between the portable type electronic apparatus of the second embodiment and the portable type electronic apparatus of the first embodiment is that a card introduction section 26 is provided at end thereof. Section 26 is for communicating with the guide channels 8 of the card holder 3, and for and introducing the front end of the IC card 100 namely, a card guide member 27 formed on the front surface is provided in the card holder 3.

As shown in FIG. 5, the card holder 3 has a card insertion slot 7 on the front surface. As shown in FIG. 4 and FIG. 5, the card introduction section 26 is formed in the card insertion slot 7 by providing the card guide member 27 having an elongated angular "u" shape. The width C of the card introduction section 26 is the same as the width of the guide channels 8, as shown in FIG. 4 and FIG. 7.

A stopper 29 has links 29A, 29A integrally formed as long and narrow plates, and a plate-like wall 29B constructed between each of the links 29A. At one end of each of the links 29A, axles 29C, to be fitted into respective engagement holes 21, 21 formed in the card holder 3 (as shown best in FIG. 5A), are integrally formed.

At the other end of each of the links 29A, 29A, there are integrally provided axles 29D, 29D communicating with long holes 20 provided in a front wall of the apparatus body 2, so as to rotate and be freely slidable.

Because the stopper 29 does not guide the IC card 100 to the card insertion slot 7, the long holes 20 can be provided in the side wall of the apparatus body 2 more closely toward the axle 12 than the engagement holes 21 formed in the card holder 3, as shown in FIG. 6.

Further, as shown in FIG. 5, concave spaces 32 are provided in the side walls of the card holder 3 for holding the links 29A, 29A of the stopper 29 when the card holder 3 is stored inside the space 5 of the apparatus body 2.

Also, as shown in FIG. 4, a notch 31 for card insertion and removal is provided in the card introduction section 26 so as to make it possible to grasp the end of the IC card 100 when the IC card 100 is inserted or removed.

Next, the operation will be explained. First of all, the slide lever 6 is slid in the unlocking direction (the direction of arrow A in FIG. 4). Then, the engagement between the lock stopper 14 and the lock member is broken. The stopper 29 is rotated by rotating card holder 3 downwards, using the axle 12 as a fulcrum, to the "preset position" regulated by the stopper 15.

If the IC card 100 is inserted by placing the front end of the IC card 100 in the card introduction section 26, the IC card 100 is correctly guided into the guide channels 8.

Further, if the front end of the IC card 100 is inserted until it runs into the interior wall, the setting of the IC card 100 to the "preset position" is completed.

After that, the card holder 3 is pushed to the upper side. Then, while the stopper 29 is stored inside the spaces 32 of the card holder 3, the card holder 3 rotates upward to the "preset position" stored inside the space 5 of the apparatus body 2, using the axle 12 as a fulcrum.

If the card holder 3 is arranged at the "set position", the lock post 14 automatically engages with the lock member, while at the same time an electrical connection is made between the connection contact 101 of the IC card 100 and the apparatus side connection contact 11, and the card introduction section 26 is closed by a front wall section of the space 5. Further, when the IC card 100 is extracted, if the slide lever 6 is again slid in the unlocking direction (the direction of arrow A in FIG. 4), the engagement between the lock post 14 and the lock member is broken. While rotating the stopper 29 the card holder 3 is caused to rotate downwards to the "preset position". In this way the IC card 100 is removed and can be exchanged for another IC card 100.

In the first and second embodiments, the rotation of the card holder 3 has been restrained by using links, but it is also possible to prevent rotation of the apparatus body 2 by providing a torsion spring on the axle 12, causing the apparatus body 2 to rotate by using an end part of the torsion spring to engage the apparatus body 2 with the card holder 3, and balancing the weight of the apparatus body 2 and the attachment force of the torsion spring at the "preset position". At this time, the stopper is directly pivoted to the wall, and the apparatus body 2 and the card holder 3 are engaged similarly to the first and second embodiments.

Further, a concave space is provided in the apparatus body 2 to receive the card holder 3, but it is also possible to put a card holder 3, that can be freely rotatably attached and detached to and from the apparatus body 2 via the axles 12, on top of the apparatus body 2.

What is claimed is:

1. A portable electronic apparatus, comprising:
   a flat apparatus body having input keys, a display and an apparatus side contact,
   a card holder having one end freely rotatably attached to a rear surface of the apparatus body via axles, and having guide channels for guiding an IC card to a specified position, whereby a connection contact of the IC card comes into contact with the apparatus side contact, and a stopper, having a wall pivotally connected at edges thereof to the apparatus body and the card holder, wherein when said card holder is rotated, the wall is pivoted and unfolded between the apparatus body and the card holder.

2. The portable electronic apparatus according to claim 1, wherein the rear surface of the apparatus body is provided with a concave space for receiving the card holder, the space having the apparatus side contact therein, and the one end of the card holder being freely rotatably attached and detached to edges of the apparatus body via the axles within said space.

3. The portable electronic apparatus according to claim 2, wherein the card holder is shaped for being received in the space of the apparatus body, and includes apertures formed in an upper surface and part of an end surface of another end thereof, said guide channels being provided on an inner side of a side wall of said card holder, and the respective axles being integrally provided on outer sides of the side wall, the connection contact of the IC card that has been guided to the specified position being brought into contact with the apparatus side contact by being led to the upper surface aperture.

4. The portable electronic apparatus according to claim 2, wherein the stopper has an axle on one edge freely rotatably pivoted to a side wall of the card holder, and an axle on another edge freely rotatably attached and detached to long holes provided in a side wall of the apparatus body.

5. The portable electronic apparatus according to claim 4, wherein the axle on the one edge and the axle on the other edge are integrally provided on respective sides of the wall.

6. The portable electronic apparatus according to claim 4, wherein said stopper has opposing plate-shaped links that are long and narrow, and which have the wall located therebetween and wherein the axle on the one edge and the axle on the other edge are integrally provided at edges of the links.

7. The portable electronic apparatus according to claim 6, wherein, during rotation of the card holder, the axle on the one edge of the stopper is located toward the card holder axles, opposite to the axle of the other edge.

8. The portable electronic apparatus according to claim 7, wherein the axle on the one edge is freely rotatably supported at a cardholder side wall in a vicinity of a card insertion slot that communicates with the guide channels.

9. The portable electronic apparatus according to claim 6, wherein said links determine a position, in a left and right direction, of an IC card coming into contact with the wall.

10. The portable electronic apparatus according to claim 3, wherein the card holder is provided at the another end thereof with a card guide member which forms a card introduction section for introducing a tip of the IC card, and which communicates with the guide channels.

11. The portable electronic apparatus according to claim 3, wherein the card holder is provided at the another end thereof with a notch for grasping an edge of an IC card.

12. A method of inserting an IC card into a retaining portable electronics apparatus, comprising:

causing a card holder, have one end side rotatably attached to an apparatus body via axles, to rotate to a preset position;

causing a wall to unfold between the card holder and the apparatus body during rotation of the card holder;

guiding an IC card to a specified position by leading the IC card to a card insertion slot that communicates with guide channels;

bringing a front edge of the IC card into contact with the wall; and causing a card holder side connection contact to come into contact with an apparatus side connection contact by returning the card holder to a set position.

* * * * *